United States Patent [19]

Stovell et al.

[11] 4,335,939
[45] Jun. 22, 1982

[54] OPTICAL MODULATORS AND APPARATUS INCLUDING SUCH MODULATORS

[75] Inventors: John E. Stovell; John Aughton; Alberto Yi, all of London, England

[73] Assignee: Crosfield Electronics Limited, London, England

[21] Appl. No.: 139,627

[22] Filed: Apr. 14, 1980

[30] Foreign Application Priority Data

Apr. 9, 1979 [GB] United Kingdom ............... 7912420

[51] Int. Cl.$^3$ .................................................. G02F 1/03
[52] U.S. Cl. ........................... 350/385; 219/121 LA; 350/387; 350/403
[58] Field of Search ............... 350/385, 387, 377, 388, 350/403, 405; 219/121 LA, 121 LB, 121 LZ; 356/350

[56] References Cited

U.S. PATENT DOCUMENTS

| | | | |
|---|---|---|---|
| 2,745,316 | 5/1956 | Sziklai | 350/385 |
| 3,214,590 | 10/1965 | Schactman | 350/387 |
| 3,499,699 | 3/1970 | Ayres et al. | 350/385 |
| 3,512,890 | 5/1970 | McLaughlin | 356/350 |
| 3,684,350 | 8/1972 | Wentz | 350/403 |
| 3,704,061 | 11/1972 | Travis | 350/388 |
| 4,135,822 | 1/1979 | Ezekiel | 356/350 |

FOREIGN PATENT DOCUMENTS 1409711 10/1975 United Kingdom ............... 350/385

*Primary Examiner*—William H. Punter
*Attorney, Agent, or Firm*—Sughrue, Mion, Zinn, Macpeak and Seas

[57] ABSTRACT

An optical modulator which is capable of passing the greatest intensity of light incident upon it when the light incident upon it is either unpolarized or has a partial or variable state of polarization, comprises a beam splitter (1) to resolve the light beam incident upon it into two plane polarized components having mutually perpendicular polarization states, one or more electro-optic cell or cells (2,18,19,22,23) which is or are arranged to receive both components of the light beam and, in use change the state of polarization of both of the components to a corresponding extent in dependence upon an electrical modulation signal applied to it or them. The optical modulator also includes analyzer means (1,17) arranged to receive the output from the electro-optic cell or cells (2,18,19,22,23) the arrangement being such that the intensity of the light output from the analyzer means (1,17) is a function of the change of the state of polarization generated in both components during their passage through the electro-optic cell or cells (2,18,19,22,23). The beam splitter and the analyzer means may be formed by the same piece of apparatus (1) and in this case the modulator preferably includes a half wave plate in the light path of both components to change their polarization states.

18 Claims, 16 Drawing Figures

OPTICAL MODULATORS AND APPARATUS INCLUDING SUCH MODULATORS

This invention is concerned with optical modulators. At present there are two basic types of modulator, an acousto-optic modulator and an electro-optic modulator.

An acousto-optic modulator includes an acousto-optic or Bragg cell. Ultrasonic acoustic waves are applied to the cell and any light passing through the cell is split into two components, one that passes straight through without deflection and another which is deflected, its deflection depending upon the frequency of the ultrasonic signal applied to the cell. By varying the intensity of the signal applied to the cell, the relative intensity of the two components may be varied until a maximum is reached in which the deflected component has a maximum intensity of about 85% of the incident light. Therefore, an acousto-optic cell is not suitable when the maximum output is required from the modulator, either because the highest possible intensity of light is required or, because the light incident upon the modulator has a very low intensity.

Another problem which can occur when using an acousto-optic cell is that severe alignment losses can occur in the cell if the input beam is divergent. As an example of this, the output of a high power YAG laser is highly divergent at high powers and thus, an acousto-optic modulator is not suitable for use with this source.

A typical electro-optic modulator comprises a polariser followed by an electro-optic cell, followed by an analyser which is formed by a second polariser. The light passing through the polariser is plane polarised and then its axis of polarisation is changed on passing through the electro-optic cell in dependence upon the electrical potential applied across the electro-optic cell. The axis of polarisation of the analyser is usually aligned with, or perpendicular to, that of the polariser, and thus the output from the analyser is intensity modulated as a function of the change in axis generated by passage through the electro-optic cell.

When unpolarised light is fed into such a modulator, at least half the intensity of the light is lost on passage through the polariser. Further, if the light incident upon the modulator is partially polarised the maximum output of the modulator will vary in dependence upon the relationship between the partial polarisation of the light incident upon the modulator and the orientation of the polariser. Where the light beam incident upon the modulator is constant and plane polarised there is no appreciable loss since the axis of the polariser can be arranged to correspond to that of the incident light but, it is not possible to arrange for this to happen in each and every circumstance. For example, the output of a high power YAG laser is randomly polarised and its state of polarisation can vary with time due to the thermal stress bi-refringence effects of the YAG material.

Thus, when it is required for a modulator to pass the greatest intensity of light incident upon it and the light incident upon it is either unpolarised or has a partial or variable state of polarisation, losses occur in conventional acousto-optic or electro-optic modulators.

According to this invention, an optical modulator comprises a beam splitter to resolve a light beam incident upon it into two plane polarised components having mutually perpendicular polarisation states, one or more electro-optic cell or cells, which is or are arranged to receive both components of the light beam and, in use change the state of polarisation of both of the components to a corresponding extent in dependence upon an electrical modulation signal applied to it or them, and analyser means arranged to receive the output from the electro-optic cell or cells, the arrangement being such that the intensity of the light output from the analyser means is a function of the change of the state of polarisation generated in both components during their passage through the electro-optic cell or cells.

Both components of the light beam are recombined and preferably they are recombined in the analyser means. Thus, the maximum output of the optical modulator in accordance with this invention is substantially equal to that of the incident beam, the only losses being those incurred by odd stray reflections throughout the system. Thus, with a modulator in accordance with this invention there is a substantial increase in maximum amount of light which is transmitted and this has particular relevance whenever it is required that the maximum light be transmitted by the modulator either because the light must have as high a power as possible or because the intensity of the light incident upon the modulator is very low.

When the modulator includes a single electro-optic cell it may be arranged so that the two components pass through the single electro-optic cell in opposite directions. In this case, the modulator preferably includes two plane mirrors which are arranged so that each mirror lies in the path of one of the components downstream from the beam splitter and reflects it into the electro-optic cell. It is possible to provide further mirrors to receive the light leaving the electro-optic cell and reflect this light to the analyser means but it is preferred that the analyser means and the beam splitter are formed by the same, common piece of apparatus and in this case, the light beams leaving the electro-optic cell preferably impinge upon the same mirrors used for reflecting the components into the electro-optic cells and, thereby, are reflected back to the common beam splitter and analyser means. In this situation it is preferred that the common beam splitter and analyser means is formed by a prism which is arranged to resolve unpolarised light incident upon it into two components having mutually perpendicular polarisation states. Examples of such a prism are nicol prisms and Glan prisms which are sometimes called Glan-Thompson prisms. Glan prisms are particularly preferred since an unpolarised input beam is resolved into two output beams which leave the prism at an angle of about 90° depending on material used. In this case, the electro-optic cell is preferably arranged at substantially 45° to both components and the two mirrors are arranged so that the light is incident to them at an angle of substantially $22\frac{1}{2}°$.

With the apparatus arranged in this way the maximum output from the modulator occurs when the electrical modulation signal applied to the electro-optic cell is at its minimum and the output of the optical modulator is thus inversely proportional to the electrical signal applied to the electro-optic cell. It is more usual to arrange for an optical modulator to give an output which is directly proportional to the electrical modulation signal applied to the electro-optic cell and, in this case, the optical modulator preferably includes a half wavelength plate in the optical path of both components of the light beam. Alternatively, a quarter wavelength plate may be placed in the path of each component of the light beam both before and after passage through the electro-optic cell.

It is also possible to have an optical modulator in which both components of the light beam pass through a single electro-optic cell in the same direction. In this case the modulator preferably includes means to deflect one, or both of the components until both components are substantially parallel to one another, both components then being introduced into the electro-optic cell, and means downstream from the electro-optic cell to deflect one or both components into the analyser means. When a single electro-optic cell is used with both components of the beam going through it in the same direction the beam splitter and the analyser are usually formed by separate pieces of apparatus.

When the optical modulator includes two electro-optic cells these are arranged with one in the path of each component of the light beam and they are preferably optically matched so that the optical path of both components of the light beam is substantially the same. When the optical modulator includes two electro-optic cells the beam splitter and the analyser means are preferably formed from separate, similar pieces of apparatus and they are preferably both formed by prisms which resolve light incident upon it into two mutually perpendicular components as already discussed.

However, when the optical modulator includes two separate electro-optic cells, the beam splitter and the analyser means may be formed by the same, common piece of apparatus and, in this case, the optical modulator further includes a mirror arranged at the downstream end of each of the electro-optic cells which reflects each component of the light beam leaving each electro-optic cell back through the electro-optic cell to return it on a conjugate path to the beam splitter. This has a particular advantage in that the effect of each of the electro-optic cells is doubled so that the cells can have a lesser length whilst still having the same effect, or, the magnitude of the electrical signal applied to each of the cells can be halved whilst still obtaining the same degree of change in the state of polarisation of the light passing through each cell. The mirrors may be curved or they may be plane.

When the beam splitter and the analyser means are formed by separate pieces of apparatus the analyser may be arranged so that it does not resolve light incident upon it into two plane polarised beams but, instead, it may be arranged to absorb light having a particular state of polarisation whilst transmitting light having a perpendicular state of polarisation. Since the function of the analyser is to convert the change in the state of polarisation caused in the electro-optic cell, or in each of the electro-optic cells, into an amplitude modulation of the light beam, it is possible to have a polariser which absorbs the unrequired parts of the light beam downstream from the electro-optic cell or electro-optic cells.

Several examples of optical modulators in accordance with this invention, and two examples of laser engraving machines incorporating such optical modulators will now be described with reference to the accompanying drawings, in which:

FIG. 1 shows a first example;

FIGS. 2a, b, c and d are optical diagrams showing the path of light through the first example with different polarisations of the light and different voltages applied to the electro-optic cell;

Figure 2A:
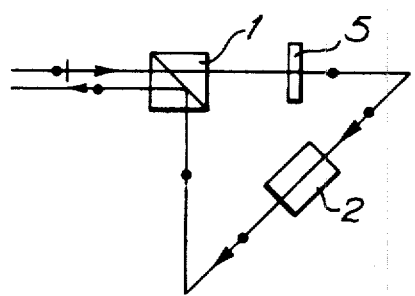
Figure 2B:
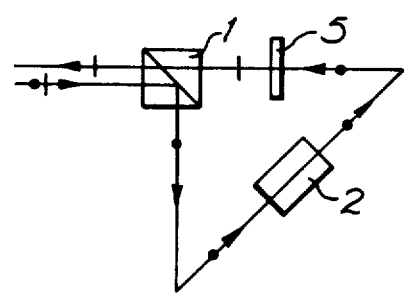
Figure 2C:
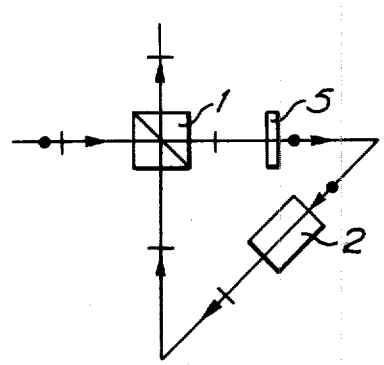
Figure 2D:
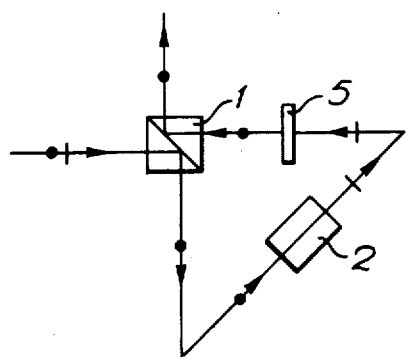

The first example includes a single Glan prism 1 which functions as the beam splitter and the analyser and a single electro-optic cell 2. Light to be modulated is introduced into the modulator via an inlet aperture 3 at a fixed focal distance away from a collimating lens 4. The parallel beam of light leaving the collimating lens 4 enters the Glan prism 1 where it is resolved into two plane polarised components. The light having a plane of polarisation in the plane of the paper passes straight through the Glan prism 1 without deviation whilst the component having a plane of polarisation normal to the plane of the paper is reflected from the interface in the prism and is deflected by substantially 90°. These two conditions are shown more clearly in FIGS. 2a, and 2b. The component passing straight through the Glan prism 1 then passes through a half wavelength plate 5 where its plane of polarisation is turned through 90° so that it now lies normal to the plane of the paper. The light is then reflected from a mirror 6 into one end of the electro-optic cell 2. The plane of polarisation of the light passing through the electro-optic cell 2 is varied in dependence upon the electrical potential applied across the cell and, in the absence of any electrical potential applied across the cell, the plane of polarisation remains unaffected whilst, with the maximum initial potential applied across the electro-optic cell, the plane of polarisation of the light is changed by 90°. The component leaving the electro-optic cell 2 is then reflected from the mirror 7 and returned to the Glan prism 1. Light having a plane of polarisation in the plane of the paper passes through the Glan prism 1 and through a focusing lens 8 whilst light having a plane of polarisation normal to the paper is reflected by the interface in the prism and is deflected towards the collimator lens 4. The component of the light beam that has its plane of polarisation normal to the plane of the paper and which is initially deflected by the Glan prism 1 impinges upon the mirror 7 and is deflected through the electro-optic cell 2, impinges upon the mirror 6, passes through the half wavelength plate 5 and, in this case, if its plane of polarisation is normal to the plane of the paper, the light is reflected at the interface and the Glan prism 1 so that it passes through the lens 8 whilst, if its plane of polarisation is in the plane of the paper the light passes straight through the Glan prism 1 without deviation towards the collimator lens 4.

FIG. 2 shows the operations more clearly with the light having a plane of polarisation in the plane of the paper being shown by the short lines transverse to the direction of propagation of the light whilst the light having a plane of polarisation normal to the plane of the paper being shown by a dot.

The beamsplitter 1 may be, for example, either a Glan prism or a Barr & Stroud type BC6P glass polarising beamsplitter. The materials used in the electro-optic cell can be KDP or ADP, or KD*P or AD*P, longitudinal or transverse type of PLZT.

Figure 3:
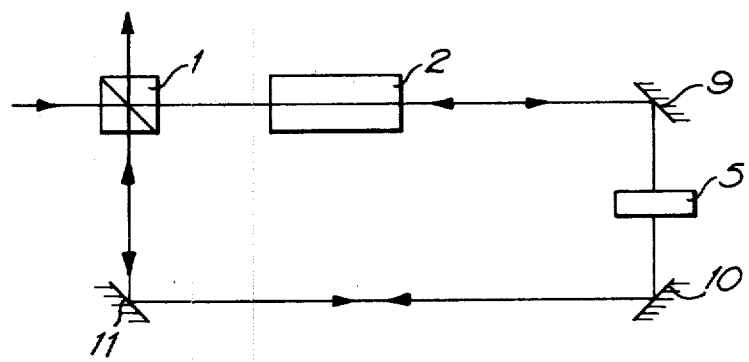
FIG. 3 shows a modification of the first example.

FIG. 3 shows a modification of the first example in which the two mirrors 6 and 7, are replaced by three mirrors 9, 10 and 11 to provide a rectangular path for both components of the light beam instead of the triangular path of the first example.

Figure 4:
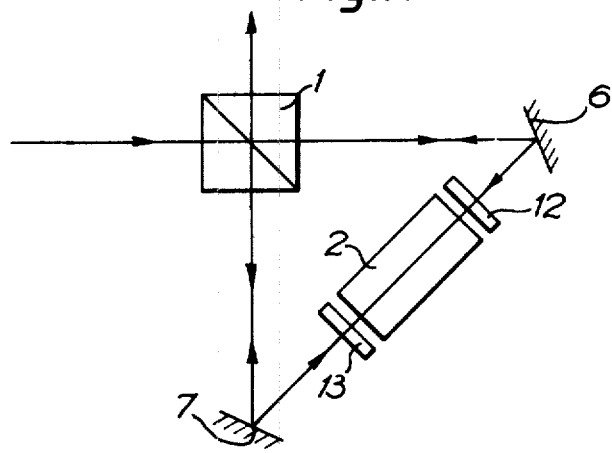
FIG. 4 shows a second modification of the first example.

FIG. 4 shows a second modification of the first example and in this modification the half wave plate 5 is replaced by a pair of plates 12 and 13 which may be half wave or quarter wave plates. When the plates 12 and 13 are formed by half wave plates, they can be used to control the pattern orientation with respect to the optical axis of the material in the electro-optic cell 2 and when they are formed by quarter wave plates the light entering the electro-optic cell will be circularly polarised and this, in the case of longitudinal KDP in the electro-optic cell, gives a dark circular spot at extinction.

Using quarter wave plates instead of single half wave plates it is possible to choose of the state of polarisation of each component after passage through both plates 12 and 13. If both quarter wave plates have the same direction of rotation the light, after passage through both plates, will have its plane of polarisation changed by 90°. However, if both quarter wave plates have opposite directions of rotation, the light, after passage through both plates, will be returned to its initial state of polarisation. Clearly therefore by selecting the relative states of rotation of the quarter wave plates the maximum intensity passed by the modulator can be arranged to correspond to no electric signal applied to the electro-optic cell or a maximum electrical signal applied to the electro-optic cell.

The light which is rejected by the Glan prism 1 is rejected in substantially the same direction as the light incident upon the modulator. In many situations this is of no great concern. However, when the modulator is used to modulate a laser beam a spurious, secondary optical cavity can be set up using this returned light which sometimes causes spurious oscillation to take place within the laser as a result of the secondary optical cavity. The various modifications shown in FIGS. 5, 6 and 7 are arranged to overcome this back reflection of the light by arranging for the light rejected by the Glan prism 1 to be dumped.

Figure 1:
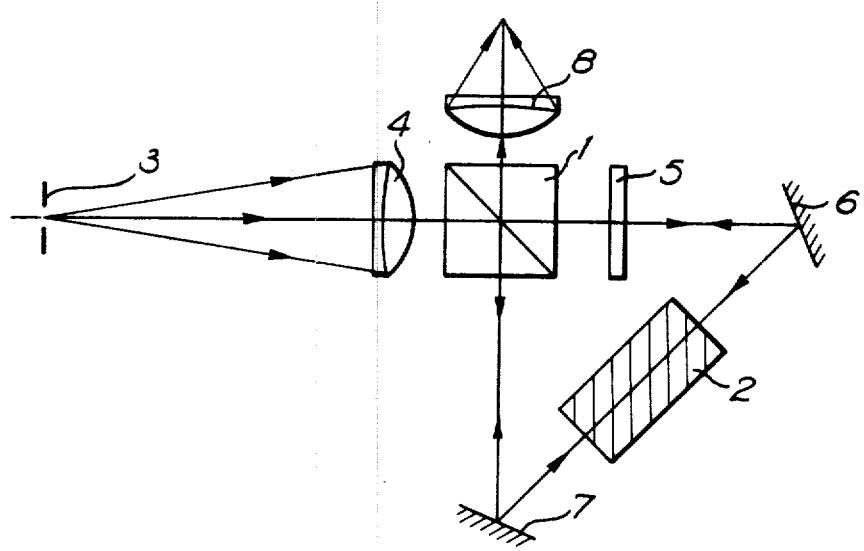
Figure 5:
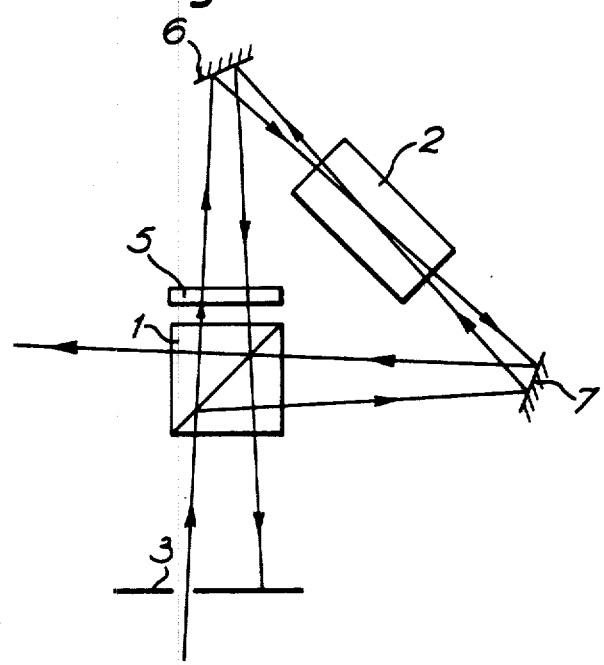
FIG. 5 shows a third modification of the first example.

The third modification of the first example shown in FIG. 5 is generally similar to the arrangement shown in FIG. 1 except that the object aperture is away from the central axis through the modulator. In this way the light does not pass in the axial direction through the system with the result that the rejected beam makes an angle with the incident beam and so impinges upon a solid part of the aperture plate where it is absorbed. In this modification the two beams of light passing in different directions through the electro-optic cell 2 are arranged at a slight angle to one another. In this modification it is preferred that the material in the electro-optic cell 2 is formed from an omnidirectional material for example PLZT—lanthanum modified lead zirconate titanate.

Figure 6:
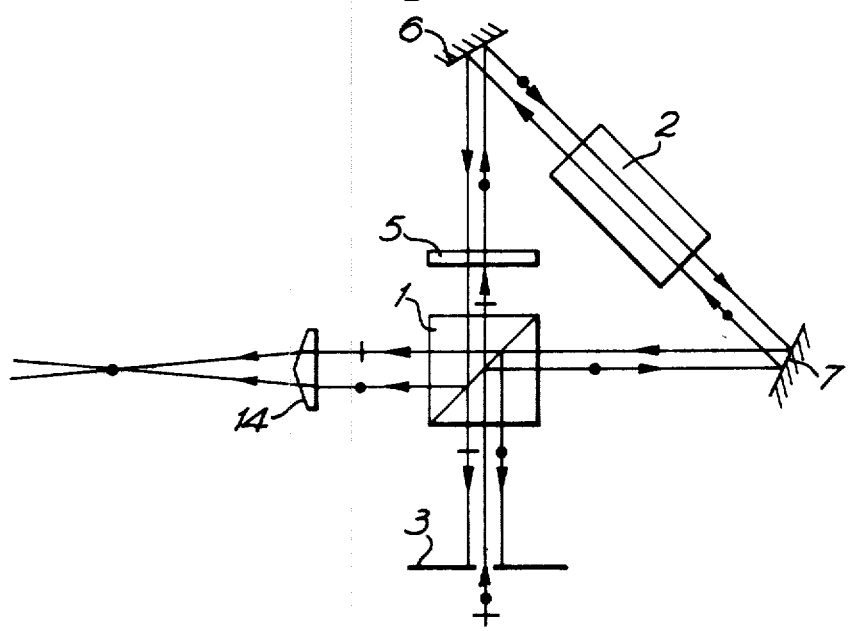
FIG. 6 shows a fourth modification of the first example.

In the fourth modification of the first example shown in FIG. 6 the beam splitting surface is slightly displaced so that the two components are displaced slightly in their path around the optical system formed by the prism 1, the mirrors 6 and 7, the electro-optic cell 2 and the half wave plate 5. In this way the two components pass through the electro-optic cell 2 in two parallel beams and this is particularly advantageous when the material in the electro-optic cell 2 is KDP or ADP. This displacement of the two components relative to one another results in there being two rejected beams laying parallel to the axis of the incident beam and, by selecting the size of the aperture in the aperture plate 3 these rejected beams can be absorbed by the aperture plate 3 and prevented from leaving through the central aperture of the aperture plate 3. Sometimes it is an advantage to have two separate output beams from the Glan prism 1, for example to control the effective spot size of the output from the optical modulator but, if required the two beams can be recombined using a prism 14 as shown in FIG. 6 or a lens or further polarising beam splitter assembly.

Figure 7:
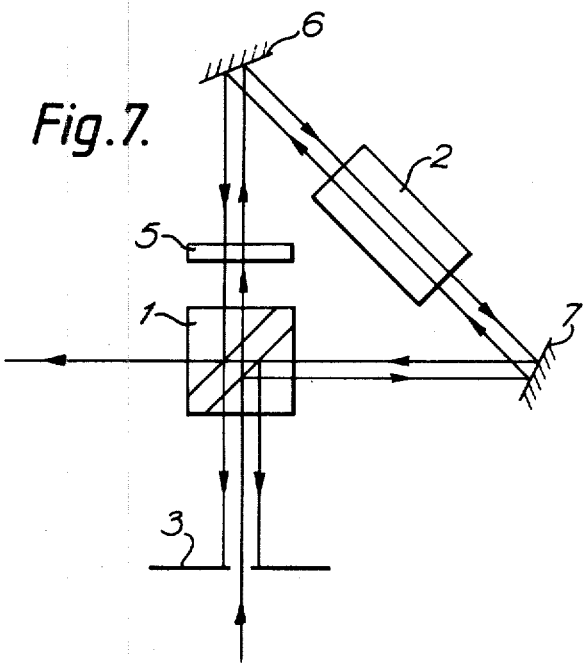
FIG. 7 shows a fifth modification of the first example.

In the fifth modification of the first example, shown in FIG. 7, the Glan prism 1 is modified to include a much thicker layer of low refractive index material. The provision of this thicker band of material having a low refractive index means that the incident beam deflected by the modified Glan prism 1 is offset from the straight through beam when they both pass through the electro-optic cell 2 in opposite directions but, both output beams are realigned after their second pass through the modified Glan prism 1. However, the rejected beams are displaced from the incident beam and, once again, these are absorbed by the aperture plate 3.

Figure 8:
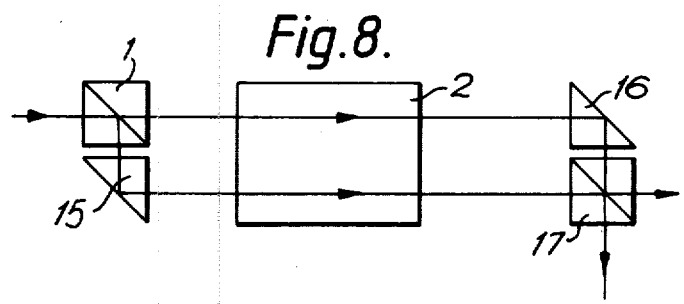
FIG. 8 shows a second example.

The second example shown in FIG. 8 also uses a single modulator but, in this example the beam splitter to resolve the light beam incident upon it into two plane polarised components is different from the analyser means. FIG. 8 shows a beam incident upon a first Glan prism 1 where the incident light beam is resolved into two components having mutually perpendicular states of polarisation, the component having a plane of polarisation in the plane of the paper going straight on whilst the component having a plane of polarisation normal to the plane of paper is deflected. The deflected component is then turned by a reflecting prism 15 so that it is parallel to the component passing straight through the Glan prism 1. Both beams then pass through a single electro-optic cell 2 in the same direction. The component that passed through the Glan prism 1 without deflection then engages a second reflecting prism 16 and both components are recombined in a second Glan prism 17.

When no electrical field is applied across the electro-optic cell, no change in the state of polarisation of the components occur in the electro-optic cell and consequently the component leaving the prism 16 is plane polarised in the plane of the paper and, passes straight through the Glan prism 17 without deviation. Equally, the component entering the Glan prism 17 from the reflecting prism 15 is plane polarised normal to the plane of the paper and this is reflected at the interface in the Glan prism 17 and is deflected.

However, when an electric field is applied across the electro-optic cell 2, the plane of polarisation of both components are changed and, the parts of each components which are changed are then resolved by the Glan prism 17, so that the changed part of the component leaving the reflecting prism 16 is deflected by the Glan prism 17 and the changed part of the component reflected from the reflecting prism 15 passes straight through the Glan prism 17.

Figure 9:
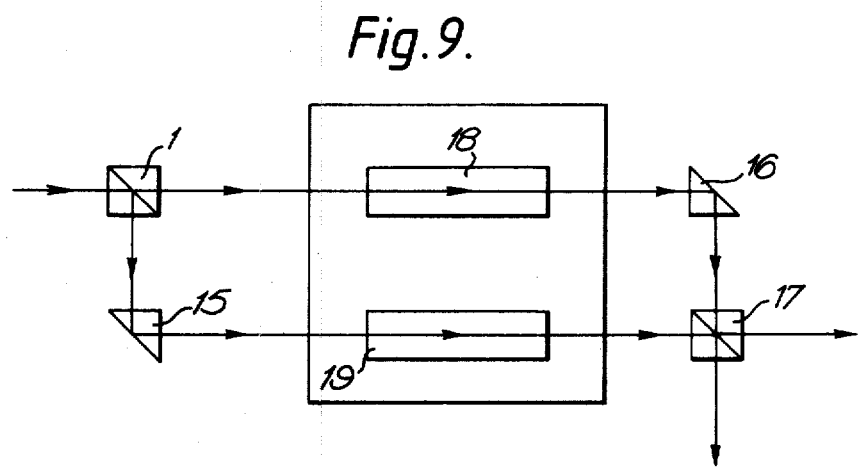
FIG. 9 shows a third example.

A third example is shown in FIG. 9 and this is generally similar to the second example except that two separate, independent electro-optic cells 18 and 19 are provided one for each component. Using the same notation as the second example the beam incident upon the first Glan prism 1 is resolved into two components having mutually different states of polarisation. The component which has a plane of polarisation in the plane of the paper passes straight through the Glan prism 1 whilst the component having a plane of polarisation normal to the plane of the paper is turned through 90°. This deflected component is again turned through 90° by the prism 15, or by a mirror, so that both components are parallel. The components then pass into the electro-optic cells 18 and 19. The electro-optic cells 18 and 19 are connected in parallel so that the same electric potential is applied across them, and the two cells are optically matched. Thus a similar change occurs to the plane of polarisation of the two components on their passage through the electro-optic cells 18 and 19. The component leaving the electro-optic cell 18 then enters the prism 16, or a mirror, and is turned through 90°. Both components are then recombined in the second Glan prism 17.

When no electrical field is applied across the electro-optic cells 18 and 19 there is no change in the polarisation states of the components and therefore the component that has passed through the cell 18 is still polarised in the plane of the paper and therefore passes straight through the Glan prism 17. The component that passes through the cell 19 is still polarised normal to the plane of the paper and so is turned through 90° by the Glan prism 17. Thus both components are joined together and leave the Glan prism as beam 20.

When an electrical field is applied to both cells 18 and 19 sufficient to cause the plane of polarisation of both components to be turned through 90° the component that has passed through the cell 18 is now polarised in a direction normal to the plane of the paper. When this component reaches the Glan prism, it is turned through 90°. The component that has passed through the cell 19 is now polarised in the plane of the paper and therefore when this reaches the Glan prism 17 this passes straight through the prism. Thus both components are once again combined and they leave the prism 17 as the beam 21. Naturally when the electric field applied to the cells 18 and 19 does not rotate the plane of polarisation of the components by as much 90° the Glan prism 17 resolves each component into two components, one which passes straight through and which is polarised in the plane of the paper and one which is polarised in a direction normal to the plane of the paper and which is turned through 90° by the Glan prism 17. Thus the intensity of the output beam 21 is directly proportional to the electric field applied to the cells 18 and 19.

Figure 10:
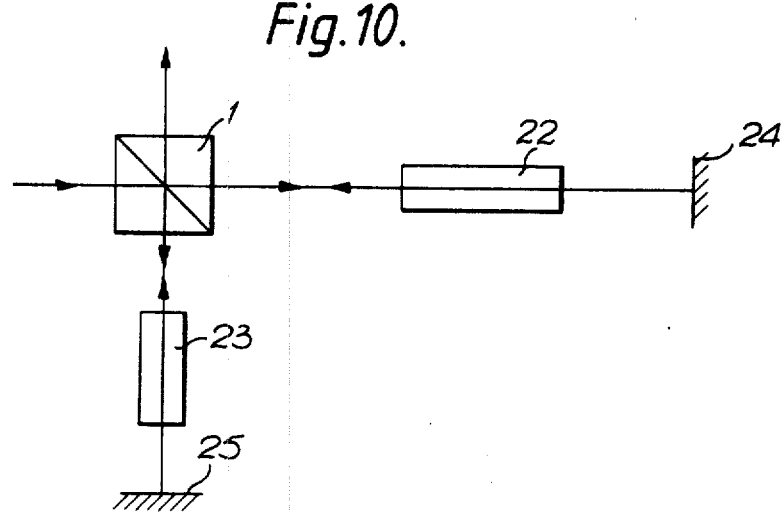
FIG. 10 shows a fourth example.

A fourth example of apparatus in accordance with this invention is shown in FIG. 10 and this example uses a single Glan prism 1 both to resolve light incident upon it into two plane polarised components and to act as the analyser means; and two separate electro-optic cells 29 and 23. This example also includes two plane mirrors 24 and 25 which are arranged to receive the light leaving the electro-optic cells 22 and 23 respectively, and return the light back through the electro-optic cells 22 and 23 to the prism 1. With this arrangement the optical path length through each of the electro-optic cells 22 and 23 is doubled which means that the cells can be half the length of those used in the previous examples. Alternatively, the cells can be the same length as those used in the previous examples, but the electric field applied across them can be reduced by half.

In this example, light incident upon the Glan prism 1 is resolved into two plane polarised components having mutually perpendicular planes of polarisation. The light having a plane of polarisation in the plane of the paper passes straight through the Glan prism 1 and then passes through the electro-optic cell 22 whilst the light having a plane of polarisation normal to the plane of the paper is deflected by the interface in the Glan prism 1, and passes through the electro-optic cell 23. The planes of polarisation of both components are changed on passage through the electro-optic cells 22 and 23 in dependence upon the electrical field applied across the cells. Both components are then reflected from the plane mirrors 24 and 25 respectively. On returning through the electro-optic cells 22 and 23 the planes of polarisation of the components are further changed again in dependence upon the electrical field applied across the cells 22 and 23 and then both components are returned to the Glan prism 1. On returning to the Glan prism 1, each component is resolved in to two parts having a polarisation state parallel to and normal to the plane of the paper and thus, any part of the component of the light returning from the electro-optic cell 22 which has a component in a plane parallel to the plane of the paper passes straight through the Glan prism 1 and returns in the same general direction as the beam incident upon the prism 1, whilst any part of the component returning from the electro-optic cell 22 which has a component normal to the plane of the paper is reflected from the interface in the Glan prism 1. Equally any part of the component of the light beam returning from the electro-optic cell 23 which has a component normal to the plane of the paper is reflected from the interface in the Glan prism 1 in the general direction of the beam incident upon the Glan prism 1. The part of the component of the light beam returning from the electro-optic cell 23 which is normal to the plane of the paper passes straight through the Glan prism 1 to combine with the other part coming from the cell 22 to form the output of the modulator.

Figure 11:
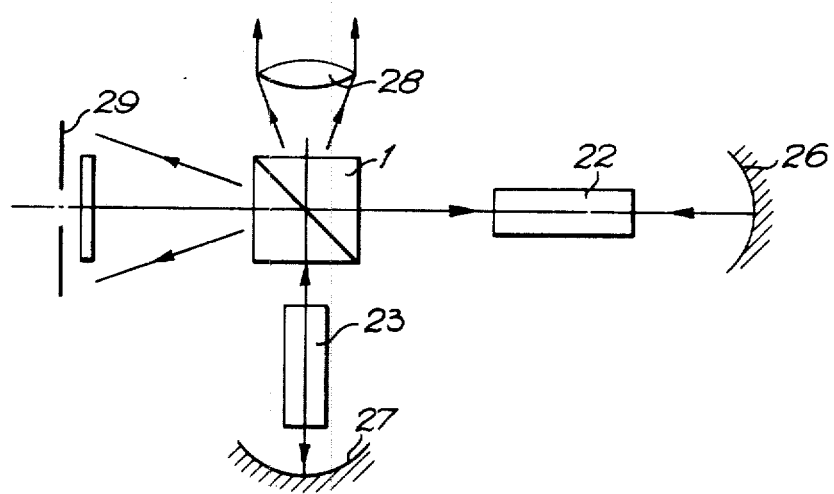
FIG. 11 shows a modification of the fourth example.

In the same way as described in the first example, with reference to FIGS. 1, 2, 3 and 4, it is inconvenient for the rejected beam to be co-axial with the incident beam when the modulator is used to modulate a laser beam because the rejected beam is returned to the laser and may interfere with the laser. To reduce the intensity of the rejected beam which is co-incident, it is possible to modify this fourth example as shown in FIG. 11. In this Figure, the general arrangement is the same as that shown in FIG. 10 except that the plane mirrors 24 and 25 are replaced by concave mirrors 26 and 27. The concave mirrors 26 and 27 cause a divergent beam to be reflected through the electro-optic cells 22 and 23 and back through the Glan prism 1. On the output side of the Glan prism 1, this divergent beam is collimated by a collimating lens 28 whilst on the incident side of the Glan prism, the rejected beam is a divergent beam and most of it is stopped by an aperture plate 29. The intensity of the small part of the rejected beam which passes through the aperture of the aperture plate and returns to the laser upstream from the modulator is insufficient to have any serious effect.

Figure 12:
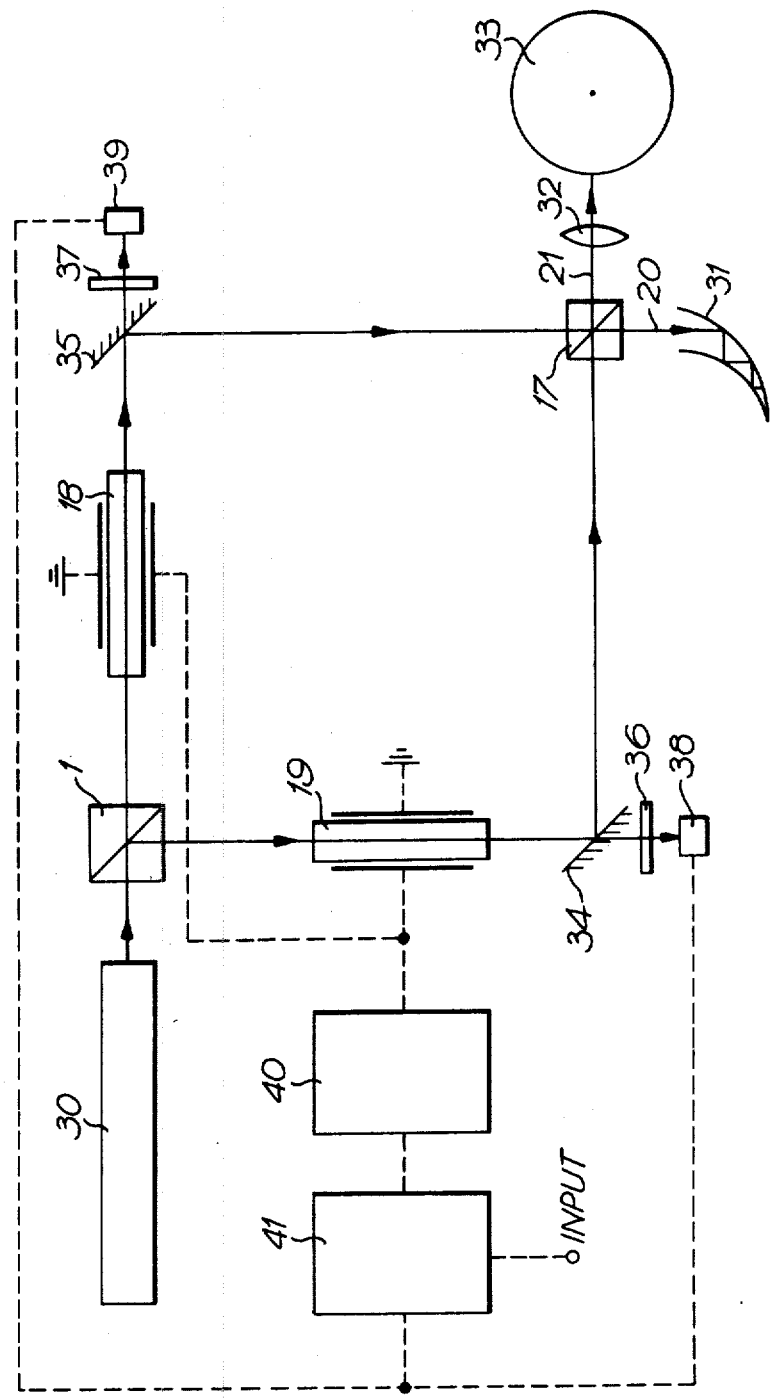
FIG. 12 shows an example of an optical modulator forming part of a laser engraving machine.

FIG. 12 shows a laser engraving machine particularly intended to engrave cylindrical printing members of plastics material which uses an optical modulator which is substantially the same as the third example described. The parts of the optical modulator carry the same reference numbers as the third example. The engraving machine comprises a YAG laser 30 forming the input to the optical modulator, a dump 31 to receive the reject beam 20 from the Glan prism 17, and a focusing lens 32 to focus the output beam 21 from the Glan prism 17, onto a printing cylinder 33. In this example the prisms 15 and 16 are replaced by mirrors 34 and 35 respectively. The mirrors 34 and 35 reflect nearly all the light incident upon them but transmit a minor portion, 0.1% or less. The light transmitted passes through dichoric polarisers 36 and 37 which have their planes of polarisation matched to the Glan prism 17 so that light passing into the dichoric polarisers 36 and 37 which is of the same polarisation state as that which on passing through the prism 17 leaves as rejected beam 20, is absorbed by the dichoric polarisers 36 and 37, whilst light passing into the dichoric polarisers 36 and 37 which is of the same polarisation state as that which on passing through the Glan prism 17 is emitted as the beam 21 is transmitted by the dichoric polarisers 36 and 37. Light transmitted by the dichoric polarisers 36 and 37 is monitored by photodetectors 38 and 39 respectively. The output of the photodetectors is therefore representative of the intensity of the light output 21 from the optical modulator and the output of the photodetectors is therefore representative of the intensity of the light output 21 from the optical modulator and the output of the photodetectors 38 and 39 is used to control an electronic feedback control system for the modulators 18 and 19. The control system includes an amplifier 40 which supplies the electrical signal to the modulators 18 and 19 and a feedback circuit 41 which receives the output from the photodetectors 38 and 39.

One difficulty with this arrangement is that the transmission characteristics of the mirrors 34 and 35 vary with the state of polarisation of the light incident upon them by a factor of as much as 10x. It is for this reason that it is preferred not to monitor the output beam 21 directly with a beam splitter and photodetector arrangement to provide a feedback control for the modulators 18 and 19. To overcome this difficulty a neutral density filter 37' may be inserted between one of the dichoric polarisers 36 and 37 and its associated photodetector 38 and 39 with the density of the filter being matched to the difference in the transmission characteristics of the mirrors 34 and 35. The neutral density filter 37' in FIG. 13 may therefore be alternatively placed between polarizer 36 and photodetector 38. Alternatively pre-amplifiers may be included in the control system between the photodetectors 38 and 39 and the feedback circuit 41 and the gain of the pre-amplifiers adjusted to compensate for the difference in the transmission characteristics of the mirrors 34 and 35.

Figure 13:
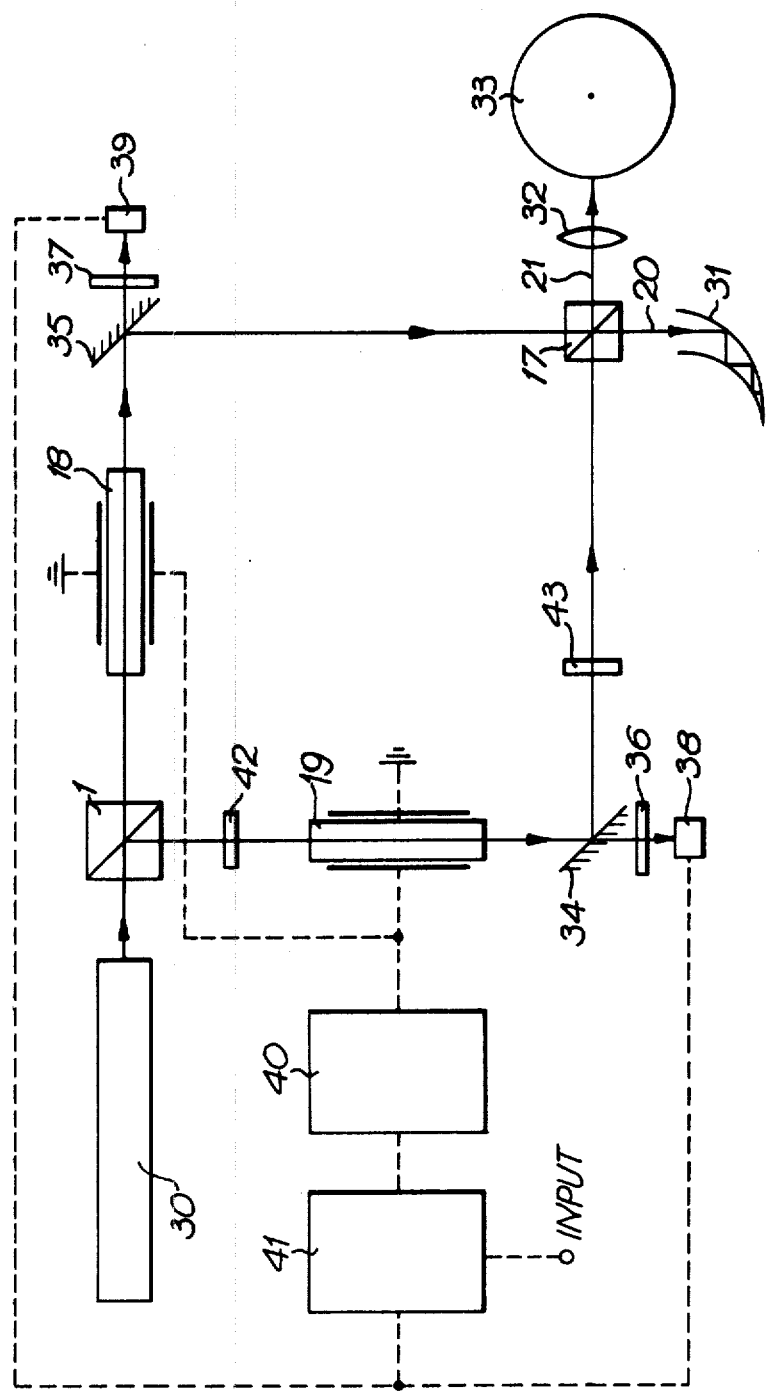
FIG. 13 shows a modification of the example shown in FIG. 12.

Another, more sophisticated way of overcoming this problem caused by the transmission of the mirrors 34 and 35 being dependent upon the polarisation state of the light incident upon them is shown in FIG. 13. This is identical to that shown in FIG. 12 except for the provision of half wavelength plates 42 and 43 between the Glan prism 1 and the electro-optic cell 19 and between the mirror 34 and the Glan prism 17. The half wavelength plate 42 thus turns the polarisation state of the light passing through it by 90° so that the polarisation state of the components entering the electro-optic cells 18 and 19 is the same. Thus the polarisation states of the light impinging upon the mirrors 34 and 35 is also the same and so the reflection/transmission characteristics of the mirrors 34 and 35 are the same. The polarisation state of the component leaving the mirror 34 is then turned back through 90° by the halfwave plate 43.

Whilst the laser engraving apparatus has been described as using an optical modulator similar to the third example it may include any one of the other examples of optical modulator which have been described.

We claim:

1. A laser engraving apparatus for engraving printing cylinders comprising, a laser source, an optical modulator having a beam splitter for resolving a light beam from said source incident upon it into two plane polarised components said two plane polarised components having mutually perpendicular polarisation states, electro-optic cell means arranged to receive both of said plane polarised components, said electro-optic cell means in use, changing the state of polarisation of both of said plane polarised components to a corresponding extent, and analyser means arranged to receive both of said components leaving said electro-optic cell means, whereby the intensity of light output from said analyser means is a function of said change in said state of polarisation generated in both components during their passage through said electro-optic cell means, wherein said optical modulator includes two partially transmitting mirrors, one of said partially transmitting mirrors being located in the path of each of said components downstream from said beam splitter; said apparatus also including control means to supply an electric signal to said electro-optic means, and a dichoric polariser and a photodetector located to receive the part of each of said components transmitted by said partially transmitting mirrors, the output of said photodetectors providing a feedback signal to said control means to control said electric signal applied to said electro-optic means.

2. The optical modulator of claim 1, wherein said analyser means and said beam splitter are formed by the same, common piece of apparatus.

3. The optical modulator of claim 2, wherein said electro-optic cell means includes only a single electro-optic cell and wherein said modulator is arranged whereby said two components pass through said single electro-optic cell in opposite directions.

4. The optical modulator of claim 3, wherein said modulator also includes two plane mirrors, said plane mirrors being arranged so that each of said mirrors lies in the path of one of said plane polarised components downstream from said beam splitter to reflect said component into said single electro-optic cell.

5. The optical modulator of claim 4, wherein said components leaving said single electro-optic cell impinge upon said mirrors used for reflecting said components into said single electro-optic cell and, thereby, are reflected back to said common beam splitter and analyser means.

6. The optical modulator of claim 2, wherein said common beam splitter and analyser means is formed by a prism which resolves unpolarised light incident upon it into two components having mutually perpendicular polarisation states.

7. The optical modulator of claim 1 or claim 4, which also includes a half wavelength plate means in the optical path of both of said plane polarised components of said light beam.

8. The optical modulator of claim 1, wherein said electro-optic cell means includes only a single electro-optic cell and wherein said modulator is arranged whereby said both components of said light beam pass through said single electro-optic cell in the same direction.

9. The optical modulator of claim 8, wherein said modulator also includes means to deflect at least one of said components until both of said components are substantially parallel to one another, both of said components then being introduced into said single electro-optic cell, and means downstream from said electro-optic cell to deflect at least one of said components whereby both of said components enter said analyser means.

10. The optical modulator of claim 1, wherein said electro-optic cell means includes two electro-optic cells which are arranged with one in the path of each of said plane polarised components of said light beam and which are optically matched whereby the optical path of both of said components is substantially the same.

11. The optical modulator of claim 10, wherein said modulator also includes means which deflect at least one of said components downstream from said beam splitter until both of said components are substantially parallel, and further means which deflect at least one of said components whereby both of said components enter said analyser means.

12. The optical modulator of claim 9, 10 or 11, wherein said beam splitter and said analyser means are formed by separate pieces of apparatus.

13. The optical modulator of claim 10, wherein said beam splitter and said analyser means are formed by the same, common piece of apparatus, and wherein said optical modulator further includes reflecting means arranged downstream of each of said electro-optic cells which reflect each of said components leaving said electro-optic cells back through said electro-optic cells to return them to said beam splitter.

14. The optical modulator of claim 12 or 13, wherein said beam splitting and the analysing means include a prism which resolves light incident upon it into two mutually perpendicular components.

15. The optical modulator of claim 6 or claim 14, wherein said prism is one of a group consisting of a Glan prism and a nicol prism.

16. The laser engraving apparatus of claim 1 wherein said laser is a YAG laser.

17. The laser engraving apparatus of claim 1, wherein a neutral density filter is interposed in said path of said part of one of said components transmitted by its said partially transmitting mirror, the density of said neutral density filter being matched to the difference in the transmission characteristics of said partially transmitting mirrors for light of different polarisation states to compensate for the difference in the transmission characteristics of said two partially transmitting mirrors.

18. The laser engraving apparatus of claim 1, wherein a pair of half wavelength plates are provided, one of said pair of half wavelength plates being located upstream of one of said partially transmitting mirrors and the other of said pair of half wavelength plates being located downstream of said one of said partially transmitting mirrors, whereby both of said components have the same polarisation state at both of said partially transmitting mirrors.

* * * * *